(12) United States Patent
Yi et al.

(10) Patent No.: US 10,565,031 B2
(45) Date of Patent: Feb. 18, 2020

(54) EVENT NOTIFICATION APPARATUS AND CONTROL METHOD OF THE SAME

(71) Applicant: SAMSUNG ELECTRONICS CO., LTD., Suwon-si, Gyeonggi-do (KR)

(72) Inventors: Sang-ung Yi, Suwon-si (KR); Young-Jin Kim, Yongin-si (KR); Hyun-jae Shin, Seoul (KR); Joon-seop Oh, Yongin-si (KR); Young-min Won, Suwon-si (KR); Seung-ho Jung, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 182 days.

(21) Appl. No.: 15/366,145

(22) Filed: Dec. 1, 2016

(65) Prior Publication Data

US 2017/0206120 A1 Jul. 20, 2017

(30) Foreign Application Priority Data

Jan. 19, 2016 (KR) .................. 10-2016-0006597

(51) Int. Cl.
*G06F 9/54* (2006.01)

(52) U.S. Cl.
CPC .................. *G06F 9/542* (2013.01)

(58) Field of Classification Search
None
See application file for complete search history.

(56) References Cited

U.S. PATENT DOCUMENTS

| | | | |
|---|---|---|---|
| 8,654,616 B1* | 2/2014 | Pope ................... | G04F 3/08 368/109 |
| 2011/0238647 A1* | 9/2011 | Ingram .................. | G08G 1/20 707/706 |
| 2015/0230059 A1* | 8/2015 | Damman ............... | H04W 4/70 455/456.6 |
| 2016/0098916 A1* | 4/2016 | Bieser .................. | G08B 19/00 340/539.1 |

FOREIGN PATENT DOCUMENTS

KR 10-2011-0061703 6/2011

\* cited by examiner

*Primary Examiner* — Umut Onat
(74) *Attorney, Agent, or Firm* — Nixon & Vanderhye P.C.

(57) ABSTRACT

An event notification apparatus is provided. The event notification apparatus may include a controller configured to set a condition for an event based on a command received from a terminal through communication circuitry, and to provide guide information corresponding to the event based on whether the condition set for the event is satisfied.

13 Claims, 10 Drawing Sheets

FIG. 1
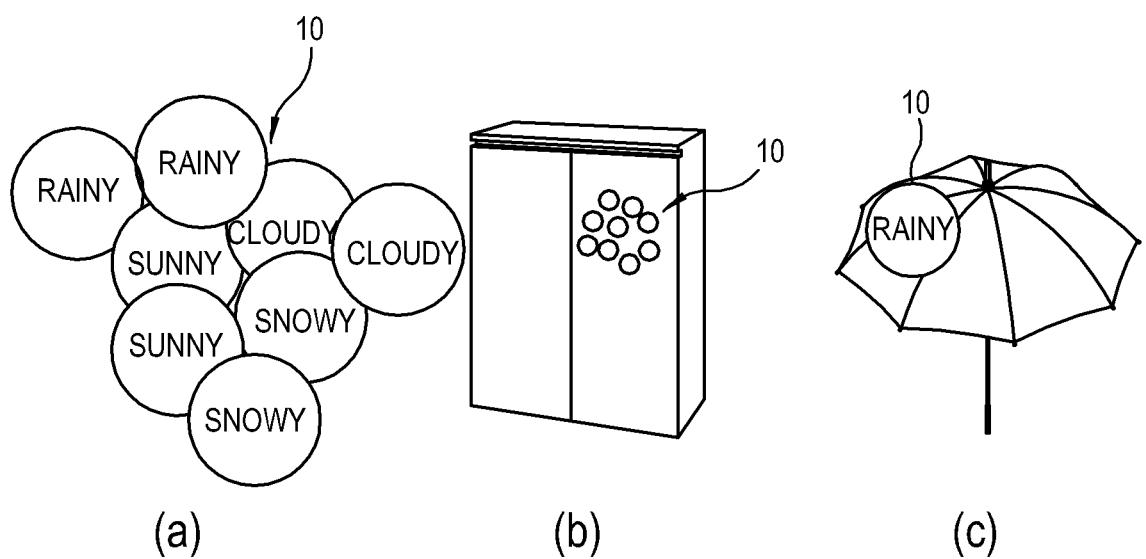
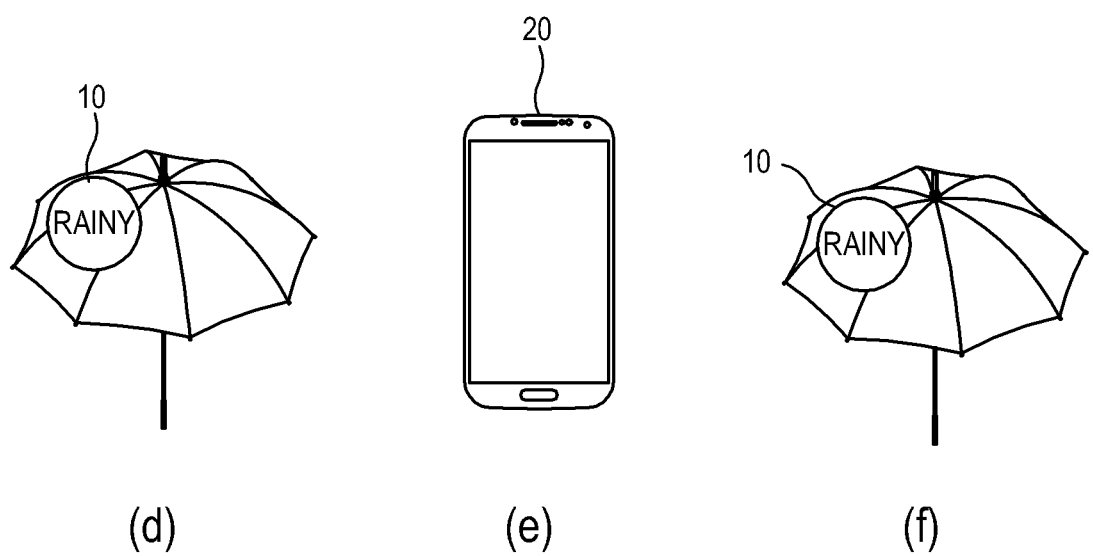

FIG. 7
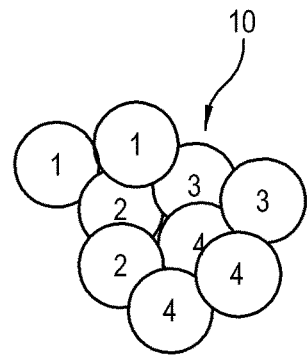
(a)
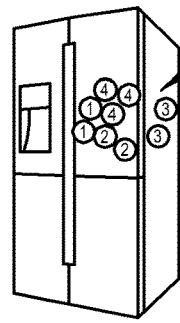
(b)
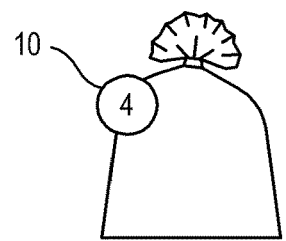
(c)
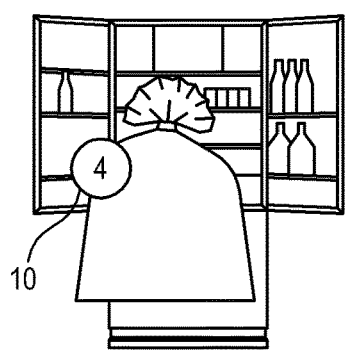
(d)
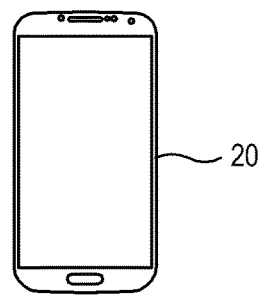
(e)
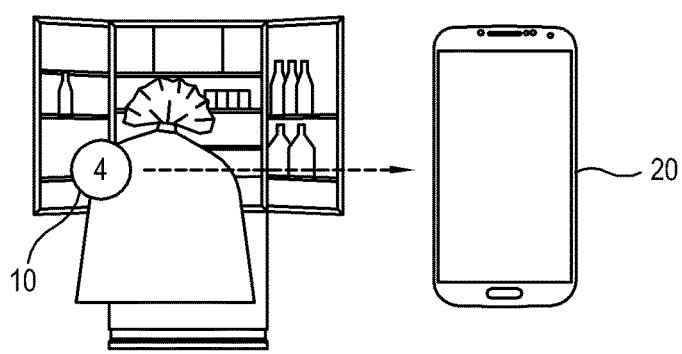
(f)
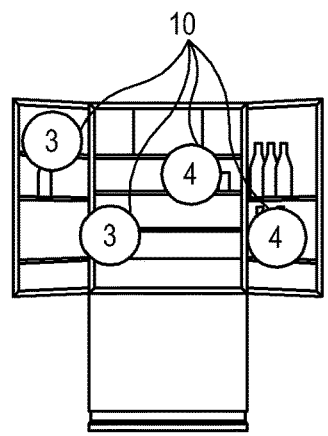
(g)

FIG. 8
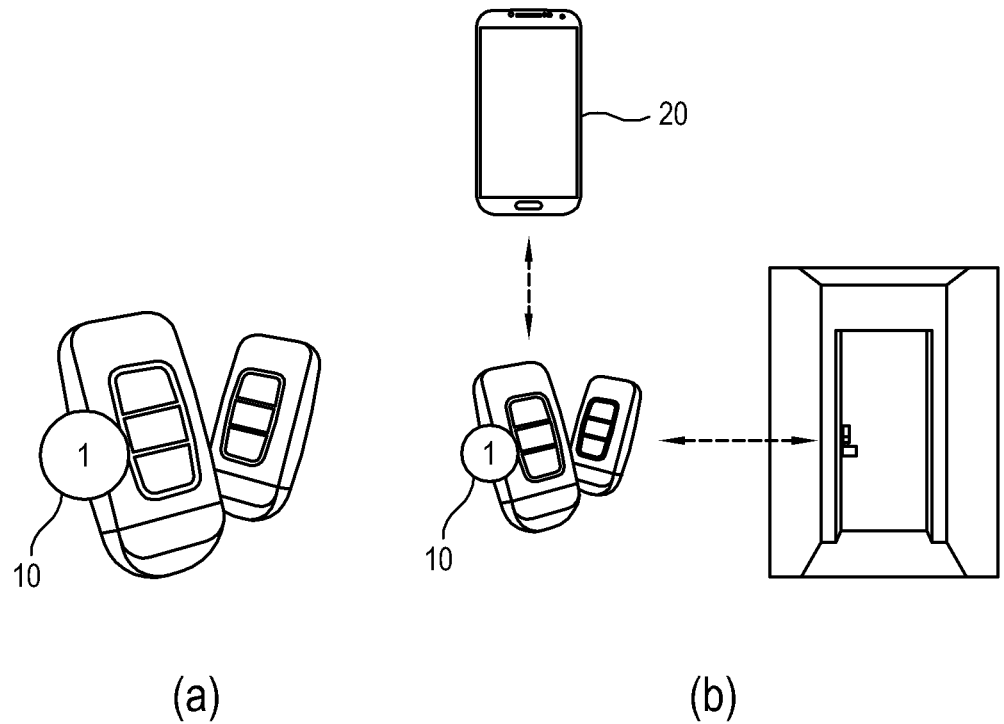
(a)  (b)
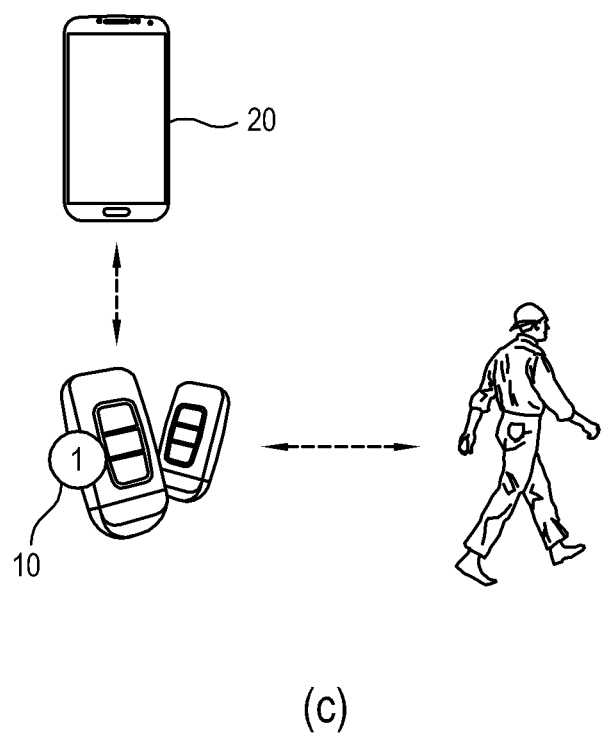
(c)

EVENT NOTIFICATION APPARATUS AND CONTROL METHOD OF THE SAME

CROSS-REFERENCE TO RELATED APPLICATION

This application is based on and claims priority under 35 U.S.C. § 119 to Korean Patent Application No. 10-2016-0006597 filed on Jan. 19, 2016 in the Korean Intellectual Property Office, the disclosure of which is incorporated by reference herein in its entirety.

BACKGROUND

Field

The present disclosure relates generally to a user terminal, which is attached to a specific thing and provides guide information to a user when a set event occurs, and a control method thereof.

Description of the Related Art

A user may employ a user terminal in setting a condition such as time or a place for an event. When the event happens, a notification signal is transmitted to the user terminal so that a user can be informed of the occurrence of the event. Such a notification is given in the form of an application, and it may be therefore difficult to know the kind of notification in accordance with circumstances even though the notification is received. Since the application of making the notification treats only information processible in the user terminal as the conditions, the kind of information to be processible is limited and not exactly matched with information about a real thing. For example, a user may be notified at a workplace that a ripening period of kimchi set as an event is expired. Although the user is aware of the notification when receiving it, s/he may forget the notification when s/he comes home from work. Like this, if the place of storing the kimchi is different from the place of receiving the notification, a problem may arise since a user cannot instantly take a step against a previously planned action.

SUMMARY

Accordingly, an aspect of one or more example embodiments may provide an event notification apparatus, which is attached to a thing and provides intuitive guide information to a user when an event set by the user happens.

According to an example embodiment, an event notification apparatus is provided, including: a communicator comprising communication circuitry configured to communicate with a user terminal; and a controller configured to set a condition for an event in accordance with a command received from the user terminal through the communication circuitry of the communicator, and to provide guide information corresponding to the event based on whether the condition set for the event is satisfied.

The event may include at least one among information about weather, information about a position of a thing, information about time related to a thing, information about danger such as a water leak, a gas leak and overheating, and information about a monitored motion and a monitored sound.

The controller may provide the guide information to the user who is within a predetermined range.

The controller may provide the guide information to the user who is out of a predetermined range.

The controller may provide the guide information based on operations of a related device.

The controller may transmit the guide information to the user terminal of the user.

The controller may transmit a command signal to a related device to provide the guide information.

The event notification apparatus further may include: a sensor configured to sense an external state; in input comprising input circuitry configured to receive an input for an operation of sensing the external state; and a power supply configured to supply power and to supply power to the controller when the input receives the input for the operation of sensing the external state, and the controller may be configured to start the operation of sensing the external state.

The power supply may include at least one of a disposable battery and a rechargeable battery, and the controller may guide a user to do at least one of replacing and charging the power supply if the power supplied from the power supply is not greater than a predetermined level.

The event notification apparatus further may include a sensor configured to sense an external state; and a notifier comprising notification circuitry configured to provide guide information corresponding to the event, wherein the sensor may be detachably mounted to the event notification apparatus and connected to the controller, and the controller may be configured to control the notifier to provide the guide information corresponding to the event based on the external state sensed by the sensor.

According to an example embodiment, a method of controlling an event notification apparatus is provided, the method including: setting a condition for an event in accordance with a command; and providing guide information corresponding to the event in accordance with whether the condition set for the event is satisfied.

The event may include at least one among information about weather, information about a position of a thing, information about time related to a thing, information about danger such as a water leak, a gas leak and overheating, and information about a monitored motion and a monitored sound.

The providing the guide information may include providing the guide information to the user who is within a predetermined range.

The providing the guide information may include providing the guide information to the user who is out of a predetermined range.

The providing the guide information may include providing the guide information in accordance with operations of a related device.

The providing the guide information may include transmitting the guide information to the user terminal of the user.

The providing the guide information may include transmitting a command signal to a related device to provide the guide information.

The method further may include: receiving an input for an operation of sensing the external state; supplying power to sense the external state; and performing control to cause a start the operation of sensing the external state.

The method further may include guiding the user to do at least one of replacing and charging a power supply including at least one of a disposable battery and a rechargeable battery if the power supplied from the power supply is not greater than a predetermined level.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein:

FIG. 1 is a diagram illustrating an example event notification apparatus according to an example embodiment;

FIG. 7 is a diagram illustrating an example event notification apparatus according to another example embodiment;

FIG. 8 is a diagram illustrating an example event notification apparatus according to still another example embodiment;

DETAILED DESCRIPTION

Below, example embodiments will be described in greater detail with reference to accompanying drawings.

FIG. 1 is a diagram illustrating an example event notification apparatus 10 according to an example embodiment used to provide guide information.

In FIG. 1, (a) denotes an event notification apparatus 10 corresponding to a desired type. On the event notification apparatus 10 may be written a word related to weather (e.g., rainy, sunny, cloudy, snowy, etc.)

In FIG. 1, (b) illustrates that the event notification apparatus is attached to a shoe rack or the like conspicuous place before use.

In FIG. 1, (c) illustrates that the event notification apparatus 10 may be coupled to a product by a clip, a clamp or the like, may be put on the product, or may be positioned around the product.

In FIG. 1, (d) a start signal may be transmitted to the event notification apparatus 10 by pressing a start button or using a user terminal 20. The event notification apparatus 10 is put into the shoe rack as it is attached to the product.

In FIG. 1, (e) illustrates that if the event notification apparatus 10 for weather (rainy) is attached to an umbrella, the attached event notification apparatus 10 may be named. For example, a user may name the attached event notification apparatus 10 an 'umbrella 1' by inputting a voice or text to the user terminal 20.

In FIG. 1, (f) illustrates that the event notification apparatus 10 for the 'umbrella 1' may receive information about rainfall probability from a network, and provide the information about the rainfall probability to a user by colors of light from a light emitting diode (LED) based on the information about the rainfall probability when s/he stands in front of the shoe rack for work. If it is currently raining or if the rainfall probability is higher than a preset probability, the event notification apparatus 10 for the 'umbrella 1' may make a sound or vibration to provide the guide information to a user. Further, the event notification apparatus 10 may have a loudspeaker to provide a user with information about detailed weather and information for guiding him/her to hold up the umbrella. The event notification apparatus 10 may provide the guide information by the light of the LED varied in color: for example, white light at the rainfall probability lower than 50%; yellow light at the rainfall probability of 50~80%; orange light at the rainfall probability equal to or higher than 80%; and red light when it is currently raining.

Figure 2:
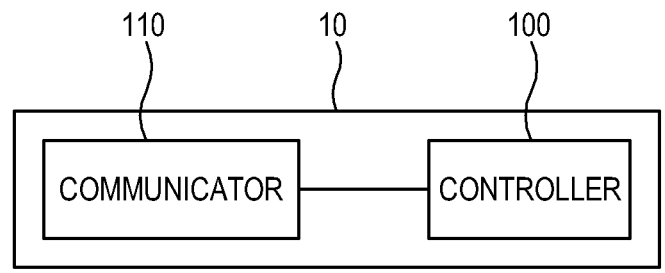
FIG. 2 is a block diagram illustrating an example event notification apparatus according to an example embodiment.

FIG. 2 is a block diagram illustrating an example event notification apparatus 10 according to an example embodiment;

The event notification apparatus 10 according to this example embodiment may include a communicator (e.g., including communication circuitry) 110 and a controller (e.g., including processing circuitry) 100.

The communicator 110 may include various communication circuitry configured to receive a signal from an external input and to transmit it to the controller 100. The communicator 110 may connect with various external input cables and receives signals from the external inputs by wires, or may receive a signal wirelessly through preset wireless communication standards.

The communicator 110 may include a plurality of connectors (not shown) to which respective cables are individually connected. The communicator 110 may receive signals from the connected external inputs, for example, a broadcast signal, an image signal, a data signal, etc. corresponding to high definition multimedia interface (HDMI), universal serial bus (USB) and component standards, or may receive communication data through a communication network.

The communicator 110 may include not only the elements and circuitry for receiving a signal/data from the external input, but also various additional circuitry elements such as, for example, and without limitation, a wireless communication module (not shown) for wireless communication or a tuner (not shown) for receiving a broadcast signal in accordance with design methods of the event notification apparatus 10. The communicator 110 may not only receive a signal from an external device but also transmit information/data/signal of the event notification apparatus 10 to the external device. That is, the communicator 110 is not limited to the element for receiving the signal from the external device, but may be achieved by an interactive communication interface. The communicator 110 may receive a control signal for selecting a user interface (UI) from a plurality of control devices. The communicator 110 may include a communication port for well-known near field wireless communication standards such as Bluetooth, Infrared (IR), ultra-wideband (UWB), Zigbee, etc. or may include a well-known communication port for wired communication. The communicator 110 may be used for various purposes of transmitting and receiving a command, data or the like for controlling the display in addition to a control signal for selecting the UI.

The controller 100 may include various processing circuitry configured to set a condition for an event in response to a user's command received from the user terminal through the communicator, and provides guide information corresponding to the event in accordance with whether the condition for the set event is satisfied.

Figure 3:
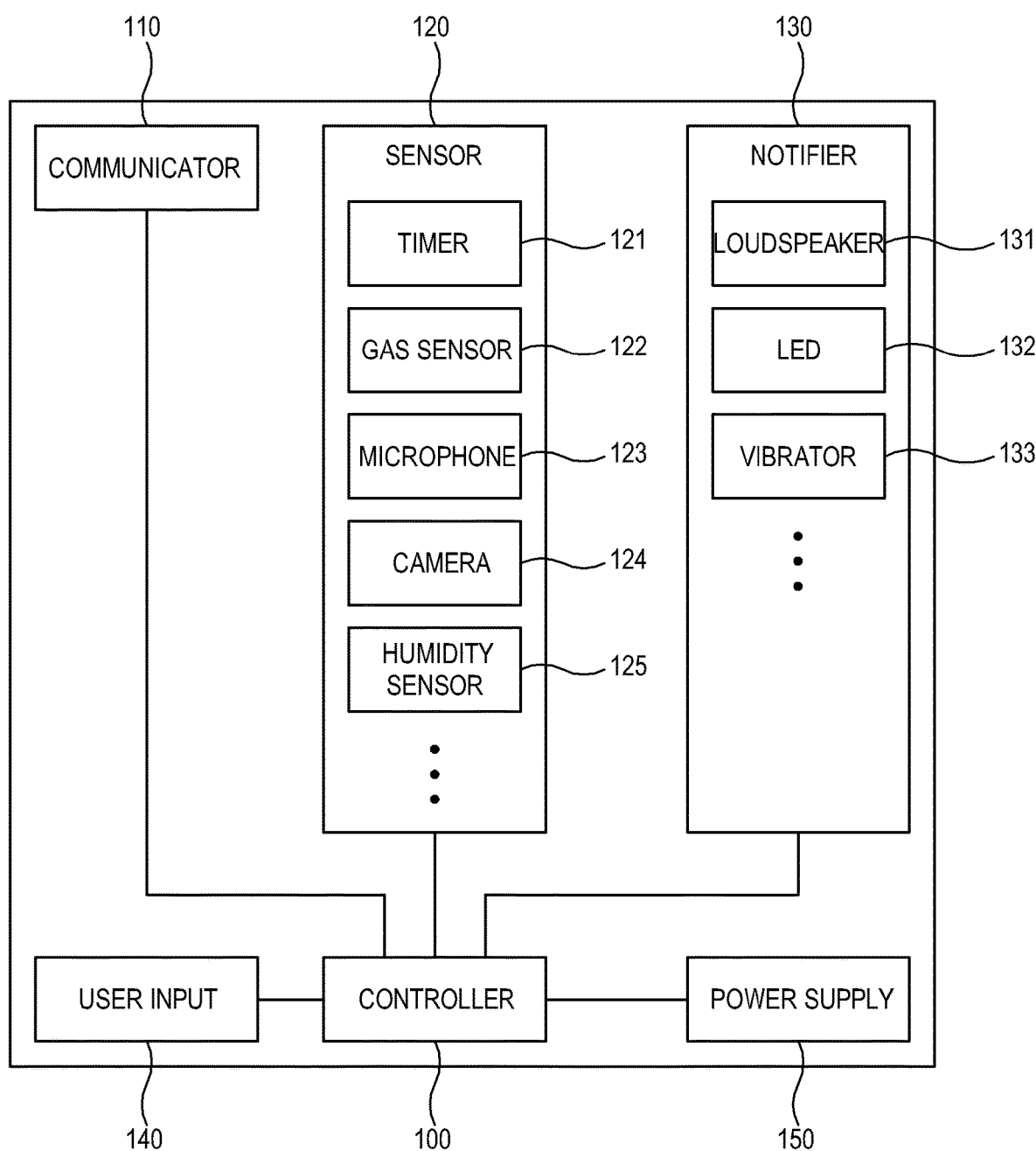
FIG. 3 is block diagram illustrating an example event notification apparatus according to an example embodiment.

FIG. 3 is block diagram illustrating an example event notification apparatus 10 according to an example embodiment. In addition to the elements of FIG. 2, the event notification apparatus 10 according to an example embodiment may further include a sensor 120, a notifier (e.g., including notification circuitry) 130, an input (e.g., including input circuitry) 140 and a power supply 150.

The sensor 120 includes, for example, a timer 121 for measuring time, a gas sensor 122 for sensing gas leakage, a microphone 123 for sensing/receiving various voices, a camera 124 for receiving/photographing a motion and an image, and a humidity sensor 125 for sensing humidity, and thus senses events, e.g., information about weather, information about a position of a thing, information about time related to a thing, information about danger such as a water leak, a gas leak and overheating, information about a monitored motion and a monitored sound, etc., thereby transmitting the event to the controller 100.

The notifier 130 may include various notification circuitry, such as, for example, and without limitation, a loudspeaker 131, a light emitting diode (LED) 132 and a vibrator 133. The notifier 130 may provide notification to a user by a preset notifying method and a notifying level when a condition for the event is satisfied.

The input 140 may include various input circuitry to send various preset commands or information to the controller 100 in accordance with a user's manipulation and input. The input 140 may be achieved by various input circuitry, such as, for example, and without limitation, a menu-key or input panel placed in an outer side of the event notification apparatus 10, or a remote controller remotely separated from the event notification apparatus 10. Besides, if the event notification apparatus 10 includes a display (not shown), the input 140 and the display may be formed as a single body. If the display is a touch screen, a user may issue a preset command to the controller 100 by touching an input menu (not shown) displayed on the display.

The input 140 may receive a user's motion and voice. A user's motion may include a touch input. The input 140 may directly receive a user's motion and voice, or may receive information about a user's motion and voice from the external device.

The power supply 150 is provided in the event notification apparatus 10 and supplies power under control of the controller 100. If the user input 140 receives a user's input for an operation of sensing an external state, the power supply 150 may supply power to the controller 100. The power supply 150 may be achieved by at least one of a disposable battery and a rechargeable battery.

The controller 100 may include various processing circuitry configured to provide the guide information to a user who is within a predetermined range. In other words, if the user terminal 20 is within a predetermined range, the controller 100 may provide the guide information corresponding to the event to be given when the condition for the set event is satisfied. For example, if a user with the user terminal 20 moves to an entryway while it is raining outside, the event notification apparatus 10 attached to an umbrella and notifying rain provides the guide information for guiding the user to take the umbrella through a notification sound, the light of the LED, or vibration. Specifically, if a sensor light installed in the entryway is turned on by sensing a user, the event notification apparatus 10 may sense that the sensor light is turned on or may receive a signal from the sensor light, thereby providing the guide information to a user. Here, the sensor light in the entryway is given as an example, but not limited thereto. Alternatively, the event notification apparatus 10 may provide the guide information by sensing that a front door is opened/closed, a user's sound or motion, etc.

Further, the controller 100 may provide the guide information to a user who is out of a predetermined range. In other words, if the user terminal 20 is out of a predetermined range, the controller 100 may provide the guide information corresponding to the event to be given when the condition for the set event is satisfied. For example, the event notification apparatus 10 may be attached to a car key. If a user moves away from a parked car while leaving the car key in the car, i.e. if a user is far from the event notification apparatus 10 attached to the car key, the event notification apparatus 10 may provide the guide information through light/sound/vibration. However, a user may not recognize the guide information since the car key is in the car, and it is thus not suitable to provide the guide information.

In this example, the controller 100 may transmit the guide information to a user's user terminal 20. For example, a preset message may be sent to the user terminal 20. Alternatively, the control signal may be transmitted to the user terminal 20 so that the user terminal 20 can ring or vibrate, thereby informing a user that the car key is in the car.

Further, the controller 100 may transmit a command signal to a related device in order to provide the guide information. For example, the related device is the car, and the control signal may make the car sound a horn.

If the user input 140 receives a user's input for an operation of sensing an external state, the power supply 150 supplies power to the controller 100 to start the operation of sensing the external state.

The power supply 150 may include at least one of a disposable battery and a rechargeable battery. If the power supplied from the power supply 150 is not greater than a predetermined level, the controller 100 may guide a user to do at least one of replacing and charging the power supply 150.

The event notification apparatus 10 may include a sensor for sensing an external state, and a notifier for notifying guide information corresponding to an event. The sensor may be mounted to the event notification apparatus 10 and connected to the controller 100, or may be detachably provided in the event notification apparatus 10. The controller 100 may control the notifier 130 to provide the guide information corresponding to the event based on the external state sensed by the sensor 120.

Figure 4:
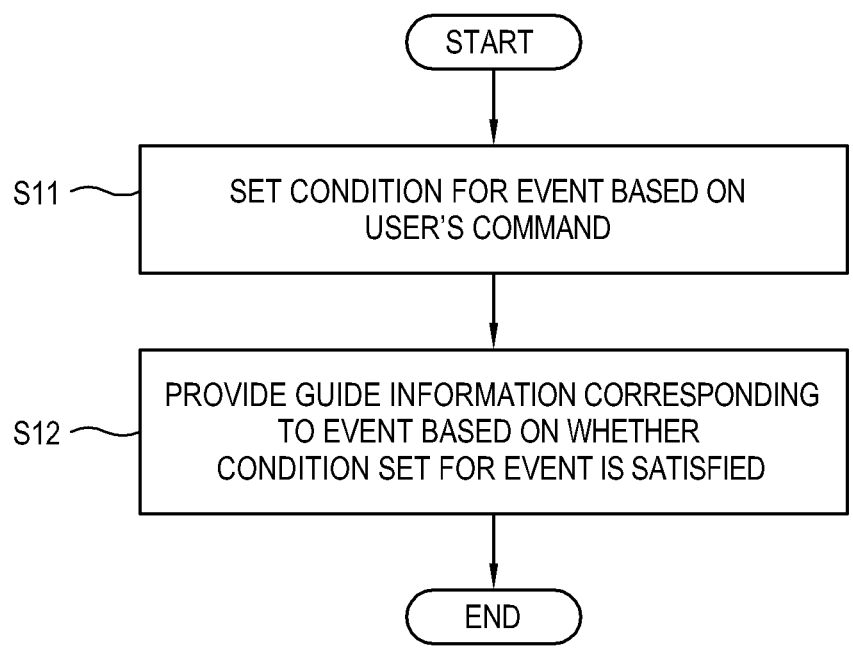
FIG. 4 is a flowchart illustrating an example of controlling an event notification apparatus according to an example embodiment.

FIG. 4 is a flowchart illustrating an example of controlling an event notification apparatus 10 according to an example embodiment.

A condition for an event is set based on a user's command (S11).

The guide information corresponding to the event is provided based on whether the set event is satisfied (S12).

Figure 5:
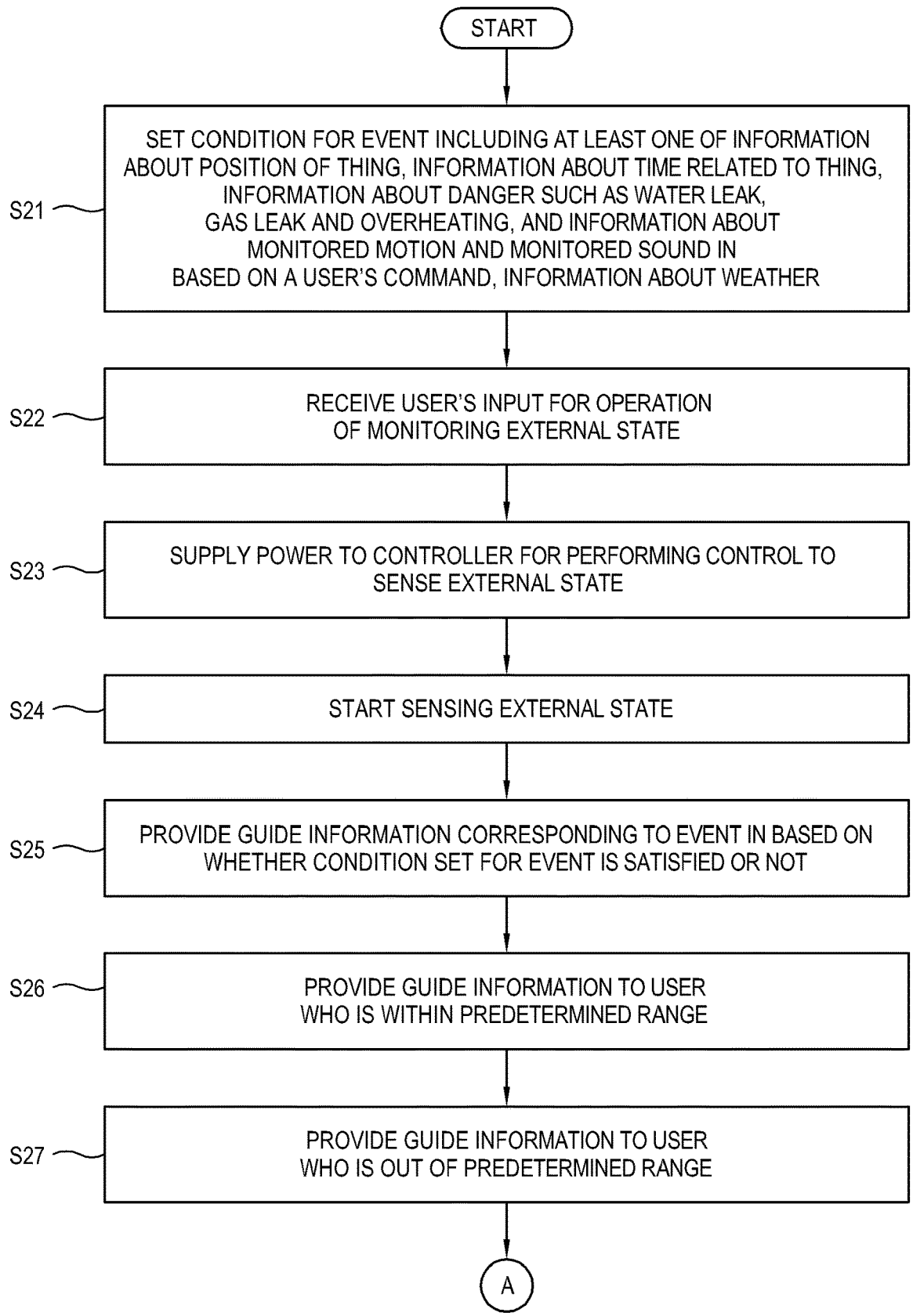
FIGS. 5 and 6 are flowcharts illustrating an example of controlling an event notification apparatus according to an example embodiment.
Figure 6:
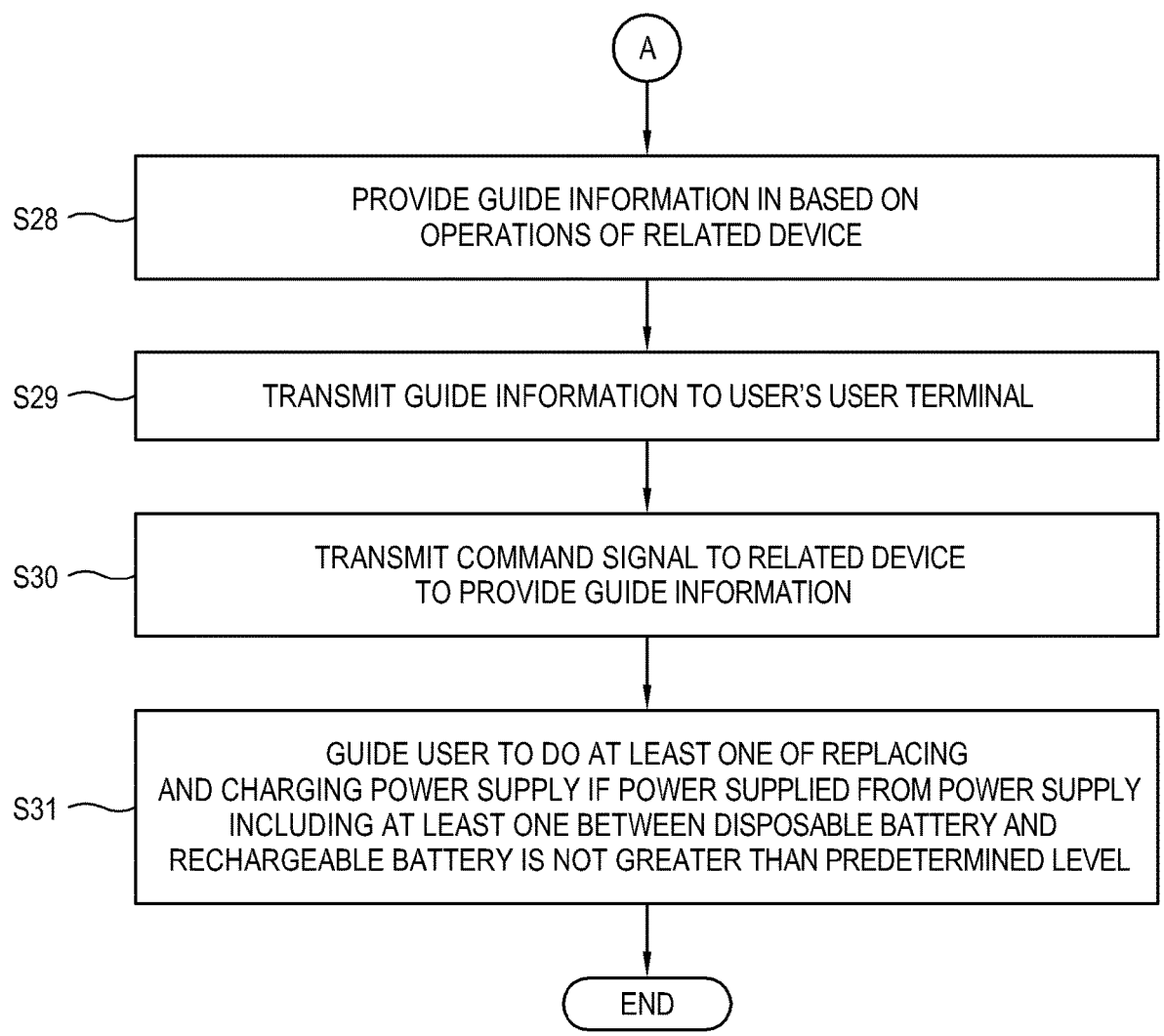

FIGS. 5 and 6 are flowcharts illustrating an example of controlling an event notification apparatus 10 according to an example embodiment.

Based on a user's command, information about weather, the event notification apparatus 10 sets a condition for an event including at least one of information about a position of a thing, information about time related to a thing, information about danger such as a water leak, a gas leak and overheating, information about a monitored motion and a monitored sound, etc. (S21).

The event notification apparatus 10 receives a user's input for an operation of monitoring the external state (S22).

Power is supplied to the controller for performing control to monitor the external state (S23).

The controller 100 performs control to start monitoring the external state (S24).

Based on whether the condition for the set event is satisfied or not, the guide information is provided corresponding to the event (S25).

The guide information is provided to a user who is within a predetermined range (S26).

The guide information is provided to a user who is out of a predetermined range (S27).

The guide information is provided based on operations of the related device (S28).

The guide information is transmitted to a user's user terminal (S29).

A command signal is transmitted to the related device to provide the guide information (S30).

If the power supplied from the power supply 150 including at least one between the disposable battery and the rechargeable battery is not greater than a predetermined level, a user is guided to do at least one of replacing and charging the power supply 150 (S31).

FIG. 7 is a diagram illustrating event notification apparatus 10 according to another example embodiment used to provide guide information.

In FIG. 7, (a) illustrates an example in which a user makes a purchase of an event notification apparatus 10 corresponding to a desired period. The event notification apparatus 10 may be written a period related to time (hour, day, week, etc.).

In FIG. 7, (b) illustrates that the event notification apparatus 10 is attached to a refrigerator and the like in a conspicuous place.

In FIG. 7, (c) illustrates that the event notification apparatus 10 may be coupled to a product by a clip, a clamp or the like, may be put on the product, or may be positioned around the product, e.g., a vegetable bag.

In FIG. 7, (d) illustrates that by pressing a start button or using a user terminal 20, a start signal may be transmitted to the event notification apparatus 10. The event notification apparatus 10 may be attached to a desired thing and then put into a refrigerator. If the desired thing is a vegetable to be kept in the refrigerator for '4' days, the event notification apparatus 10 marked with '4' is attached to a vegetable bag.

In FIG. 7, (e) illustrates that if the event notification apparatus 10 for time (4 days) is attached to the vegetable bag, the attached event notification apparatus 10 may be named. For example, a user may name the attached event notification apparatus 10 'bean sprouts' by, for example, inputting a voice or text to the user terminal 20.

In FIG. 7, (f) illustrates that the event notification apparatus 10 for the 'been sprouts' may provide guide information so that the user terminal 20 can be informed that three days or one day remains until a set event, e.g., an expiration date. Further, when the data has expired, the guide information may make a sound or vibration so that a user can be informed that the expiration date has passed. The event notification apparatus 10 may have a loudspeaker to provide a user with information about a detailed expiration date through a sound/light/vibration. The event notification apparatus 10 may provide the guide information by the light of the LED varied in color: for example, white light during a term of three days left before the expiration date; yellow light during a term of one day left before the expiration date; orange light on the very day of the expiration date; and red light when the expiration date has passed. Similarly, sound and vibration information may be also set like this. The event notification apparatus 10 may provide the guide information about corresponding terms when a door of the refrigerator is opened. As the terms are distinguished by different light/sounds/vibrations, a user recognizes it when s/he opens the door of the refrigerator, as illustrated in (g) of FIG. 7, thereby preventing food from going bad. In this example embodiment, the event notification apparatus 10 is used for the refrigerator and thus set with respect to time, but not limited thereto.

FIG. 8 is a diagram illustrating an example event notification apparatus 10 according to still another example embodiment used to provide guide information;

In FIG. 8, (a) illustrates that a user may attach the event notification apparatus 10 to a car key and set the name of the event notification apparatus 10 by inputting a voice to the user terminal 20. In this example embodiment, the event notification apparatus 10 is named a 'car key'.

In FIG. 8, (b) illustrates that if a user leaves his/her house without the car key, the event notification apparatus 10 for the 'car key' may provide a user with a voice guide of 'Please make sure to take the car key'. Here, a control signal may be transmitted to the user terminal 20 so that a user can be informed of the voice guide of 'please make sure to take the car key'. Like this, the guide information is not limited to the voice guide as long as it is given to make a user take the car key.

In FIG. 8, (c) illustrates that a user may drop or lose the car key while carrying the car key. If a user is out of a predetermined range from the car key, the guide information may provide him/her with a voice guide of 'Please be aware of a risk of losing the car key'. Here, a control signal may be transmitted to the user terminal 20 so that a user can be informed of the voice guide of 'Please be aware of a risk of losing the car key'.

Figure 9:
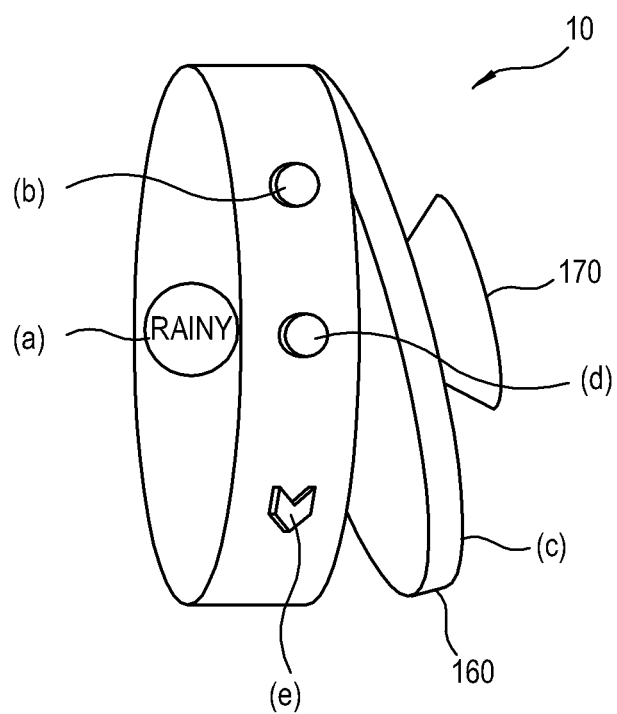
FIG. 9 is a diagram illustrating an example shape of an event notification apparatus according to an example embodiment.

FIG. 9 is a diagram illustrating an example shape of an event notification apparatus 10 according to an example embodiment.

In FIG. 9, the event notification apparatus 10 is related to weather and marked with a 'Rainy'. Therefore, when a rainy event occurs or is expected, the guide information is provided to a user.

In FIG. 9, (a) may denote a weather event: for setting weather (e.g. rain) as a condition for the event notification apparatus 10.

In FIG. 9, (b) illustrates an LED: for providing a user with the guide information.

In FIG. 9, (c) illustrates a suction cup: for the event notification apparatus 10 to be attached to a product. The suction cup may be shaped like a clamp 160 and clamp a part of a product so as to be attached to the product. Further, the suction cup may be provided as a vacuum sucker 170 and attached to the product.

In FIG. 9, (d) illustrates a clip: for serving as a clip to be attached to the product.

In FIG. 9, (e) illustrates a start button: provided in the event notification apparatus 10 and used for starting the notification of the event. Alternatively, the user terminal 20 may be used for starting the operation.

Figure 10:
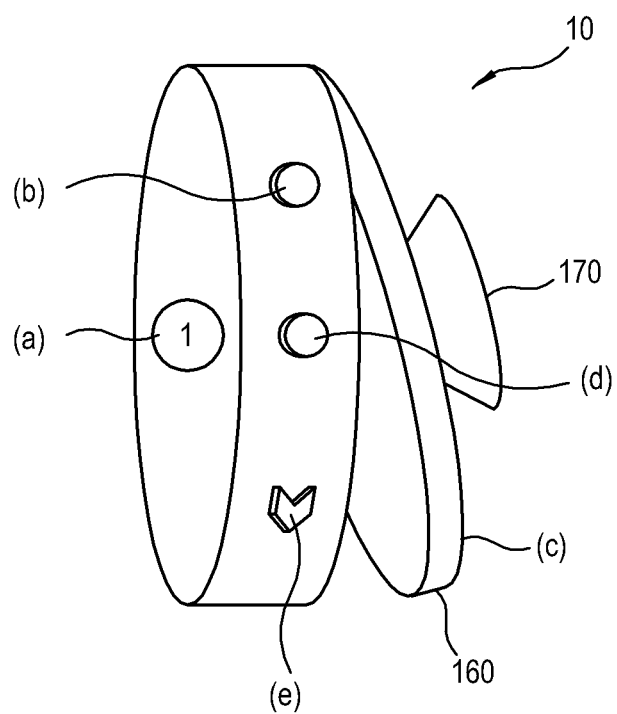
FIG. 10 is a diagram illustrating an example shape of an event notification apparatus according to another example embodiment.

FIG. 10 is a diagram illustrating an example shape of an event notification apparatus 10 according to another example embodiment.

FIG. 10 illustrates the event notification apparatus 10 analogous to that of FIG. 9 except a notice board provided in an area (a) and displaying a numeral. The event notification apparatus 10 with the notice board displays a numeral to be changed, and is thus useful when the event is set for time. Further, the clamp 160 and the suction cup 170 illustrated in FIG. 9 may be replaced by a magnet to be easily attached to a surface of a refrigerator or the like iron plate.

If the foregoing event notification apparatus 10, in which a condition for an event is set with respect to a thing, is attached to the thing, a user is provided with the guide information from the event notification apparatus 10 when the condition for the event are satisfied, so that s/he can utilize the thing suitably for the event intended for him/her along with a natural moving line.

According to an example embodiment, a notification is given when a condition for an event are satisfied, so that a user can intuitively take an action with respect to a thing along with a natural moving line, thereby increasing a notification effect.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. An event notification apparatus comprising:
   a communicator comprising communication circuitry configured to communicate with a terminal;
   a notifier comprising notification circuitry configured to provide guide information through at least one of sound, light, or vibration;
   an attachment to attach the event notification apparatus to a thing;
   a plurality of sensors comprising a first sensor configured to detect an event, and a second sensor configured to detect an external state change around the event notification apparatus; and
   a processor configured to:
      set a condition for the event based on a command received from the terminal through the communicator,
      identify whether the set condition is satisfied based the event detected by the first sensor,
      based on identifying that the set condition is satisfied, identify whether a user is within a predetermined range from the event notification apparatus based on the external state change around the event notification apparatus detected by the second sensor,
      based on identifying that the user is within the predetermined range from the event notification apparatus, control the notifier to provide the guide information corresponding to the event, and
      based on identifying that the user is not within the predetermined range from the event notification apparatus, control the communicator to transmit the guide information corresponding to the event to the terminal transmit.

2. The event notification apparatus according to claim 1, wherein the event comprises at least one of: information about weather, information about a position of the thing, information about time related to the thing, information about at least one of danger situations which include a water leak, a gas leak and overheating, and information about a monitored motion and a monitored sound.

3. The event notification apparatus according to claim 1, wherein the processor is configured to identify the external state change around the event notification apparatus based on operations of a related device.

4. The event notification apparatus according to claim 1, wherein the processor is configured to transmit a command signal to a related device to provide the guide information.

5. The event notification apparatus according to claim 1, further comprising
   an input comprising input circuitry configured to receive a user input; and
   a power supply configured to supply power,
   wherein the power supply supplies power to the processor based on receiving the user input for detecting the external state change through the input, and the processor is configured to control the second sensor to detect the external state change.

6. The event notification apparatus according to claim 5, wherein
   the power supply comprises at least one of a disposable battery and a rechargeable battery, and
   the processor is configured to control the notifier to provide information for the user to do at least one of replacing and charging the power supply if the power supplied from the power supply is not greater than a predetermined level.

7. The event notification apparatus according to claim 1, wherein the plurality of sensors are detachably mounted to the event notification apparatus.

8. A method of controlling an event notification apparatus comprising a communicator comprising communication circuitry configured to communicate with a terminal, a notifier configured to provide guide information through at least one of sound, light, or vibration, and a plurality of sensors comprising a first sensor and a second sensor, the method comprising:
   setting a condition for an event based on a command received from the terminal;
   identifying whether the set condition is satisfied based the event detected by the first sensor;
   based on identifying that the set condition is satisfied, identifying whether a user is with a predetermined range from the event notification apparatus based on an external state change around the event notification apparatus detected by the second sensor;
   based on identifying that the user is with the predetermined range from the event notification apparatus, providing the guide information corresponding to the event through the notifier, or based on identifying that the user is not with the predetermined range from the event notification apparatus, transmitting the guide information corresponding to the event to the terminal.

9. The method according to claim 8, wherein the event comprises at least one of: information about weather, information about a position of the thing, information about time related to the thing, information about at least one of danger situations which include a water leak, a gas leak and overheating, and information about a monitored motion and a monitored sound.

10. The method according to claim 8, further comprising:
    identifying the external state change around the event notification apparatus based on operations of a related device.

11. The method according to claim 8, wherein the transmitting the guide information comprises transmitting a command signal to a related device to provide the guide information.

12. The method according to claim 8, further comprising
    receiving user input for detecting the external state change; and
    supplying power to detect the external state change.

13. The method according to claim 12, further comprising providing information for the user to do at least one of: replacing and charging a power supply, the power supply comprising at least one of a disposable battery and a rechargeable battery, if the power supplied from the power supply is not greater than a predetermined level.

* * * * *